May 5, 1959 H. D. MECH 2,885,586

TELEVISION RECEIVER

Filed Dec. 24, 1954

Inventor
Henry D. Mech
by
Mason, Kolehmainen, Rathburn & Wyss
Attorneys

United States Patent Office 2,885,586

Patented May 5, 1959

2,885,586

TELEVISION RECEIVER

Henry D. Mech, Corfu, N.Y., assignor to Sylvania Electric Products, Inc., a corporation of New York Application December 24, 1954, Serial No. 477,481

8 Claims. (Cl. 313—76)

The present invention relates to television receivers, more particularly to mounting arrangements which may be employed therein to support a magnetic sweep yoke assembly on the neck of an image reproducing cathode ray tube near the bell portion thereof, and the invention has for an object the provision of a new and improved mounting arrangement for securing a conventional magnetic sweep yoke assembly to a cathode ray picture tube in a simple, reliable and, consequently, economical manner.

It has been common practice in conventional television receivers to support the cathode ray picture tube on the receiver chassis from at least two points, one on the bell portion of the tube near the face thereof and the other at the neck thereof. With such arrangements the neck of the picture tube is supported by means of the sweep yoke assembly which itself is attached directly to a portion of the receiver chassis. Forward movement of the picture tube with respect to the chassis is prevented by means of a stop arrangement attached to the chassis and located forward of the picture tube face, and rearward movement of the picture tube with respect to the chassis is prevented by the forward end of the yoke assembly engaging the belled surface of the tube.

It has recently been found to be expedient, however, to support a television picture tube in a television receiver entirely from the forward or flared body portion thereof. When the picture tube is so mounted, means must be provided for fixedly supporting the sweep yoke assembly with respect to the picture tube to prevent variations in picture size, focus and brightness with the consequent annoyance to the viewers of the reproduced image.

It is, therefore, another object of the present invention to provide a new and improved mounting arrangement for supporting a cathode ray sweep yoke assembly in a fixed position relative to the associated cathode ray picture tube.

A further object of the invention is to provide a new and improved cathode ray centering and sweep yoke assembly mounting arrangement whereby the yoke assembly is supported directly on and entirely by the cathode ray picture tube.

A still further object of the present invention is to provide a new and improved inexpensive mounting arrangement whereby a cathode ray sweep yoke assembly is supported entirely from the cathode ray tube and is maintained in a fixed relative position thereto.

The invention, both as to its organization and method of operation, together with further objects and advantages thereof will best be understood by reference to the following detailed description taken in connection with the accompanying drawings, in which.

Figures 1, 2, 3:
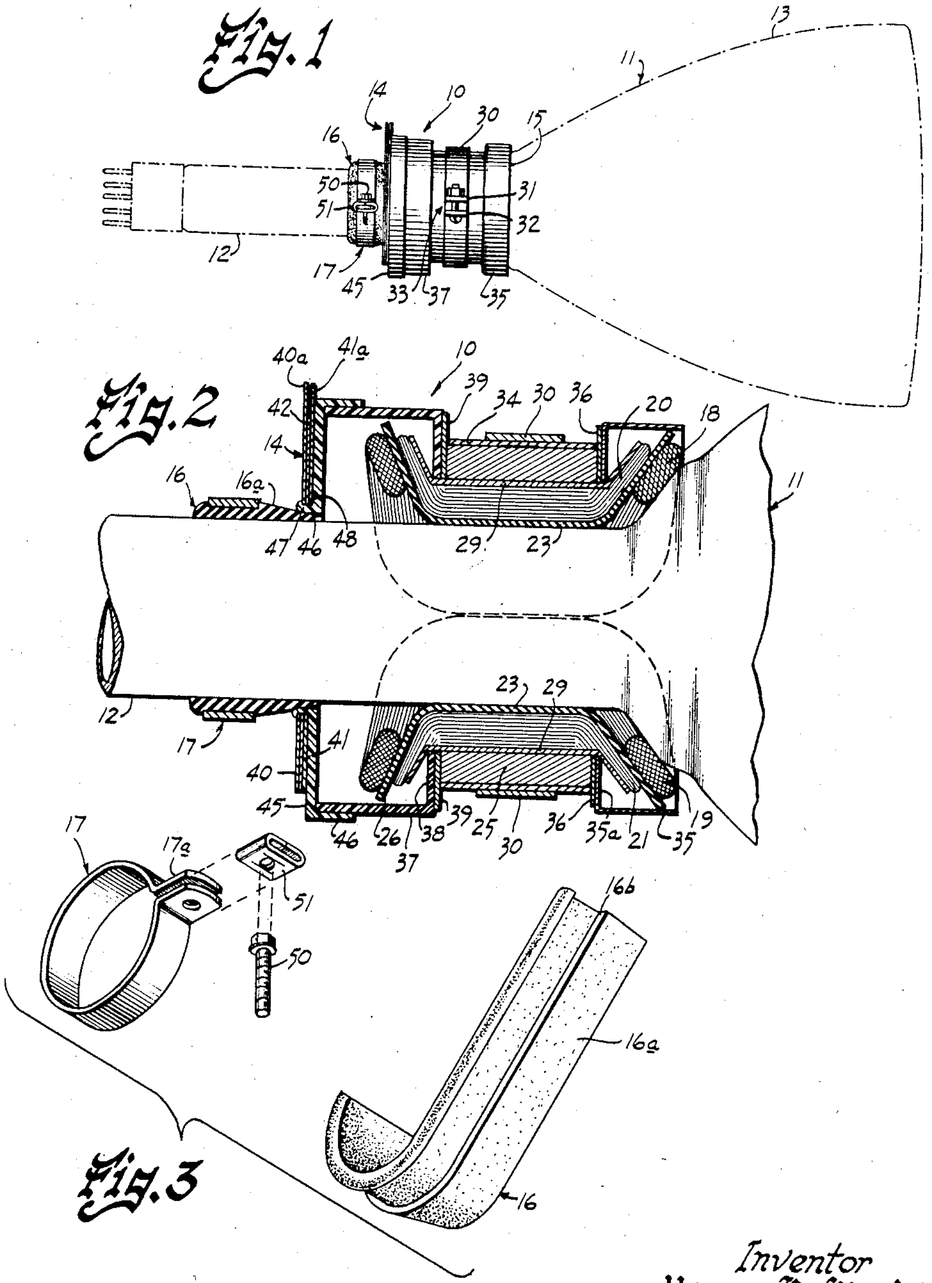
Fig. 1 is a plan view, partially diagrammatic, of a sweep yoke mounting arrangement embodying the features of the present invention.
Fig. 2 is a fragmentary sectional view of the mounting arrangement of Fig. 1 taken on a plane passing through the axis of the tube.
Fig. 3 is an exploded perspective view of a clamping member used in the mounting arrangement of Figs. 1 and 2.

Referring now to the drawing, the present invention is therein illustrated as comprising a hollow, cylindrically shaped cathode ray tube sweep yoke and focusing assembly 10 which is arranged in operative engagement with a cathode ray television image reproducing device 11 around the elongated neck portion 12 thereof. The forward end 15 of the assembly or unit 10 abuts against the flared body portion 13 of the picture tube 11 and is fixedly secured in this relative position by means of a cylindrically-shaped resilient member 16 which has a tapered forward portion **16*a* and which is fastened to the tube neck 12 by means of a non-magnetic clamp 17**.

The sweep yoke and focusing assembly 10 comprises a pair of vertical deflection windings 18 and 19 and a pair of horizontal deflection windings 20 and 21. These deflection windings are arranged in the conventional manner to define a cylinder having approximately the diameter of the neck 12 of the tube 11. A generally cylindrical insulating member 23, conveniently formed from rubber or other plastic material in two semi-cylindrical portions to facilitate assembly of the sweep yoke 10, is disposed intermediate the vertical windings 18, 19 and the horizontal windings 20, 21.

An annular magnetic structure 25 surrounds the horizontal deflection coils 20, 21 and is insulated therefrom by means of a generally cylindrical member 29 having flared ends and which is conveniently constructed in two pieces for ease of assembly. The magnetic structure 25 is constructed of a magnetic material having a relatively low reluctance and formed of a plurality of annular segments which are arranged about the horizontal deflection windings and secured thereto by means of a split ring clamp 30, the mating ends of which are apertured and offturned to provide a pair of ears 31 and 32 for reception of a conventional nut and bolt assembly 33. The clamp 30 is electrically insulated from the magnetic structure 25 by means of a split ring insulating member 34. To prevent dust and other foreign material from collecting on the forward portion of the deflecting coils and also for safety purposes, an annular collar 35 having an inwardly directed flange **35*a* at the rear end thereof, is positioned over the forward end of the assembly such that the inner shoulders of the flange 35*a* abut against the insulating member 29 so as to hold the cover in place. A split insulating washer 36 is interposed between the forward end of the magnetic member 25 and the flange 35*a*. The rearward portion of the deflection coils are surrounded by an insulating member 37 having an inwardly directed flange portion 38 which abuts at the inner surface thereof on the insulating member 29. An insulating spacer 39 similar to the washer 36 is provided intermediate the magnetic member 25 and the flange 38 of the cover 37**.

The centering device 14 conventionally includes a pair of disk-shaped magnets 40 and 41 which are identical in shape and separated by means of an insulating ring 42 which is located therebetween. In order to facilitate adjustment of the relative positions of the magnetic rings 40 and 41 with respect to the longitudinal axis of the cathode ray tube 11 the ring 40 is provided with an extending tab **40*a* and the ring 41 is provided with an extending tab 41*a*. The centering rings 40, 41 and the insulating ring 42 are sandwiched together and rotatably mounted on a rearwardly directed annular flange 46 of a cover member 45 which is adapted telescopically to engage the rearward periphery of the cover 37. The member 45 is provided with a central aperture 47 located adjacent the flange 46 which is substantially larger than the outer surface of the neck 12 of the picture tube 11**. The rings are held in place against the member 45 by means of a recess 48 in the external periphery of the hub carried by the flange 46, as illustrated in Figure 2.

Having the parts which go to make up the completed mounting arrangement of the present invention clearly in mind, a better understanding of the invention may be had from a consideration of the way in which the sweep yoke 10 is mounted on the picture tube 11. Assuming that the picture tube 11 has been assembled to the television receiver cabinet from the forward end thereof, the yoke 10 including the pre-assembled deflection windings and centering magnets is placed over the neck of the tube 10 and slidably moved forward until the forward end of the yoke 10 abuts the conical portion 13 of the picture tube 11. In this position, the deflection windings 18, 19 bear directly against the outwardly flared portion of the picture tube 11. The resilient member 16 is then folded about the neck 12 of the tube 10 and the tapered portion 16*a* thereof is wedged in the aperture 47 between the cover member 45 and the tube neck 12.

A non-magnetic clamp 17 having outwardly extending lugs 17*a* at the mating ends thereof is placed over the member 16 and employed rigidly to secure the member 16 by tightening the threaded screw 50 in the nut 51 (Fig. 3).

To facilitate attachment of this assembly to the picture tube 11 and to provide a more secure mounting arrangement the resilient member 16 is provided in the form of a strip which is placed about the neck of the tube by wrapping and is then inserted within the aperture 46 to secure the assembly 10 in place against the rearward face of the conical portion 14 of the picture tube. A recess 16*b* in the member 16 is adapted to accommodate the clamp 17 to prevent slippage between the clamp 17 and the resilient member 16 both during assembly and during normal use of the mounting apparatus.

It is necessary that the clamp 17 and the resilient member 16 be constructed of a non-magnetic material because of their close proximity to the centering magnets and the magnetic deflection windings. The prior art mounting apparatus, being used to support the sweep yoke from the outside thereof and consequently not being appreciably within the magnetic circuit thereof, is usually formed of a magnetic material such, for example, as iron or steel. The present invention utilizes a mounting structure which is positioned within the magnetic circuits of the sweep yoke and must, therefore, be non-magnetic. It has been found that a resilient member 16 formed of rubber and a clamp formed of brass provide a mount which does not distort the centering or sweep magnetic fields. It has further been found, however, that a clamp constructed of a magnetic material such, for example, as iron, may be employed provided that the screw 50 is constructed of a non-magnetic material such that a complete magnetic ring does not surround the neck of the picture tube.

While there has been described what is at present considered to be the preferred embodiment of the invention, it will be understood that various modifications may be made therein which are within the true spirit and scope of the invention as defined in the appended claims.

What is claimed and desired to be obtained by Letters Patent of the United States is:

1. A unitary centering and deflecting apparatus for a cathode ray tube comprising a deflecting unit adapted to receive the neck of said cathode ray tube, a centering unit including a pair of rotatably mounted magnets arranged for rotation about the longitudinal axis of said cathode ray tube on a non-magnetic bushing member surrounding the neck of said tube, a non-magnetic wedge shaped member adapted to be partially wrapped around the neck of said tube and to partially extend between adjacent portions of said bushing member and said tube, and a non-magnetic clamp adapted to engage said resilient member to secure it to said tube, thereby to secure said centering and deflecting apparatus to said cathode ray tube.

2. The combination of a cathode ray tube having a neck portion and a flared bulb portion, a magnetic deflection unit having a central recess adapted to receive said neck portion of said cathode ray tube, said deflection unit being positioned on said neck portion with one end thereof abutting said flared portion, a magnetic centering unit secured to and insulated from said deflection unit said centering unit having a pair of disk like magnets and having a central hub adapted loosely to surround the neck of said tube said hub having an internal diameter greater than the external diameter of the neck of a cathode ray tube, said hub having a recessed external periphery adapted to rotatably support the magnets of said magnetic centering unit, a resilient member having a tapered surface, said resilient member being positioned about the neck of said tube with a portion of the tapered surface thereof interposed within said aperture between said centering unit and the said neck of said tube, and a non-magnetic clamp positioned about the portion of said resilient member extending without the aperture in said centering unit to secure said resilient member to said cathode ray tube at a fixed location thereon while permitting rotation of the magnets of said magnetic centering unit.

3. Apparatus for mounting a deflection unit on a cathode ray tube, said deflection unit comprising a coil assembly over the neck of said cathode ray tube; an insulating cover member having a central opening greater in diameter than the diameter of the neck portion of said cathode ray tube, said cover member being adapted to hold said deflection coil assembly against the flared portion of said cathode ray tube; a tapered resilient wedge adapted to fit into the space between said cover member and the neck of the tube; and, non-magnetic clamping means for securing said resilient member of the neck of said tube against axial movement.

4. Apparatus as claimed in claim 3, characterized by the fact that said resilient wedge is in the form of a split strip of resilient material and is recessed so as to accommodate said magnetic clamping means.

5. Apparatus for mounting a deflection coil assembly in a fixed position on a cathode ray tube, said coil assembly being positioned about the neck of said cathode ray tube and having its forward end in contact with the flared portion of said tube; a cylindrical cover member having an apertured hub, the aperture of said hub being greater in diameter than the external diameter of the neck of said tube, said cover member being of insulating material, the hub of said cover member being externally recessed; a magnetic centering unit rotatably carried by said cover member, said centering unit being mounted within the external recess of said hub; a wedge-shaped resilient member of insulating material adapted to fit in the space between said hub and the neck of the cathode ray tube so as to hold said cover and coil assembly in place on the neck of the tube; and, a non-magnetic clamp around said resilient member and spaced from said cover member for securing said resilient member to the neck of the cathode ray tube.

6. Apparatus as claimed in claim 5 characterized by the fact that said wedge-shaped member is in the form of a resilient strip so as to facilitate insertion in the space between the hub and the neck of the cathode ray tube and being further characterized by the fact that said strip is recessed so as to accommodate said non-magnetic clamp.

7. A focusing assembly for a cathode ray tube, said assembly having its forward end abutting against the flared end of the tube and its rear end secured against axial movement to the neck of the tube, said assembly comprising horizontal and vertical deflection windings arranged around the neck of the cathode ray tube; an insulating member between said windings; an annular magnet surrounding said horizontal deflection coil; an insulator insulating said annular magnet from said horizontal deflection coil; a clamp for clamping said annular magnet with respect to said horizontal deflection coil; an annular collar having inwardly directed flanges around the forward end of said assembly, said inwardly directed flanges abutting against the insulating member between the horizontal and vertical coils; an annular insulating member having an inwardly extending flanged portion surrounding the rearward portion of said deflection coils, said inwardly directed flanged portion engaging the rearward end of said annular magnetic member; a pair of disk-shaped centering magnets separated by an insulating ring at the rearward end of said focusing assembly; a cylindrical cover member telescopically engaging said last mentioned, annular, insulating member, said cylindrical cover member having an inwardly directed flange portion, said inwardly directed flange portion terminating in a hub with a central aperture greater in diameter than the external diameter of the neck of the cathode ray tube over which said focusing assembly is to be mounted, said hub having an external annular recess in which said disk-shaped centering magnets are rotatably held in place; a tapered resilient wedge within the space between said hub and the neck of the cathode ray tube; and, a non-magnetic clamp for securing said tapered resilient wedge to the neck of the cathode ray tube.

8. Apparatus as claimed in claim 7 characterized by the fact that the resilient tapered wedge is in the form of a flexible strip to be wrapped about the neck of the cathode ray tube and being further characterized by the fact that said resilient strip is recessed to accommodate said non-magnetic clamp.

References Cited in the file of this patent

UNITED STATES PATENTS

| | | |
|---|---|---|
| 2,336,837 | Bedford | Dec. 14, 1943 |
| 2,443,025 | De Tar | June 8, 1948 |
| 2,513,929 | Gethmann | July 4, 1950 |
| 2,565,331 | Torsch | Aug. 21, 1951 |
| 2,694,782 | Ingle | Nov. 16, 1954 |
| 2,793,311 | Thomas | May 21, 1957 |